United States Patent [19]
Yasuda et al.

[11] Patent Number: 5,955,152
[45] Date of Patent: Sep. 21, 1999

[54] ELECTROSTATIC POWDER COATING METHOD

[75] Inventors: Shinichiro Yasuda, Tokyo; Masayuki Maruta, Wakayama, both of Japan

[73] Assignee: Kao Corporation, Tokyo, Japan

[21] Appl. No.: 08/908,956

[22] Filed: Aug. 8, 1997

[30] Foreign Application Priority Data

| Aug. 8, 1996 | [JP] | Japan | 8-227634 |
| Aug. 8, 1996 | [JP] | Japan | 8-227730 |
| Aug. 8, 1996 | [JP] | Japan | 8-227750 |

[51] Int. Cl.$^6$ .................................... B05D 1/06
[52] U.S. Cl. .......................... 427/475; 430/126
[58] Field of Search .................. 430/126; 399/308, 399/302; 427/475

[56] References Cited

U.S. PATENT DOCUMENTS

| 3,063,859 | 11/1962 | Heckscher | 430/126 |
| 5,655,199 | 8/1997 | Yamashita et al. | 430/126 |
| 5,742,889 | 4/1998 | Tazelaar et al. | 430/126 |
| 5,745,831 | 4/1998 | Nakazawa et al. | 430/126 |

FOREIGN PATENT DOCUMENTS

| A-4504431 | 8/1992 | Japan . |
| A-7 24366 | 1/1995 | Japan . |
| A-7 874 | 1/1995 | Japan . |
| 90 06345 | 6/1990 | WIPO . |

*Primary Examiner*—John Goodrow
*Attorney, Agent, or Firm*—Birch, Stewart, Kolasch & Birch, LLP

[57] ABSTRACT

An electrostatic latent image formed on a light-sensitive body is developed by making a thermosetting powder coating material adhere under electrostatic force to the light-sensitive body. The powder coating material on the light-sensitive body is transferred from the transfer part of an intermediate transfer body which is softer than the light-sensitive body and the object to be coated, onto an object to be coated. The powder coating material is thermally set in such a way that it is able to bake onto the object to be coated.

11 Claims, 6 Drawing Sheets

ELECTROSTATIC POWDER COATING METHOD

FIELD OF THE INVENTION

The present invention relates to a method for carrying out electrostatic powder coating.

DESCRIPTION OF THE RELATED ART

In recent years, many efforts have been made on an international level to prevent the deterioration of the global environment, because changes of the global environment result in problems. In the field of coating technology, the use of paint containing organic solvents generates various problems, for example, pollution due to paint spillage, pollution due to volatile organic compounds (VOC), and malodor. To resolve these problems, high-solid paint, aqueous paint, and methods of powder coating have been developed. The powder coating, in particular, is free from the problems of pollution and hazards due to organic solvents, because it uses powder coating material containing no organic solvent. Other advantages of the powder coating are ease of thick coating and automated operation.

On coating lines for electrical products and the like, powder coating methods are used to form PCM (pre-coated metal) by pre-forming a coating film on a sheet-shaped metal material before it is worked. This allows reductions in the cost of, greater compactness in, and energy savings from the coating equipment, and an improvement in productivity due to the reduction in painting and baking times.

One method of powder coating is the electrostatic powder coating method. In this, the coating film is formed by statically charging a thermosetting powder coating material to a positive polarity or negative polarity, blowing it onto the object to be coated, where it adheres, and then making it set thermally in such a way that the powder coating material is able to bake onto the object to be coated. In order to carry out such an electrostatic coating method, the powder coating material is statically charged and shot out using a powder coating gun known as a corona gun or tribo gun.

The corona-charge spray gun applies high voltage, for example, 70 to 100 KV, to corona electrodes arranged at the exit of the powder coating material by using a high-voltage generator, to achieve corona discharge from the electrodes. By this discharge, the powder coating material, is transported by pressurized air is charged. The charged powder coating material thus travels in the electric field formed between the corona gun and the object to be coated, and then adheres to the object to be coated to form the coating film.

When the corona-charge spray gun is used, however, only a few percent of the ions discharged from the corona electrodes are available for charging the powder coating material. The remaining unutilized ions form ozone and generate an odor. Also, because electrostatic repulsion, known as back ionization, occurs at high speeds, craters and pinholes are likely to appear in the coating film. In addition, a phenomenon known as the Faraday cage effect occurs, in which the entry of powder coating material into hollows of the object to be coated is interfered with. This decreases adhesion efficiency of the powder coating material, so that it difficult to obtain a smooth uniform coating film. As another problem, dust adhesion to the coating film is likely.

Conventional triboelectric guns transport the powder coating material via a straight transportation path by pressurized air. The powder coating material is charged by static electricity generated by friction between the powder coating material and the transportation face surrounding the transportation path.

However, the powder coating material transportation path of the conventional triboelectric spray gun is practically straight. For this reason, the chance of contact between the transportation face and particles of the powder coating material is so little that the charge efficiency is low. As a result, the maximum blowing capacity is limited, the adhesion efficiency is low, and, when the object to be coated has a wide surface area, coating takes a long time.

In addition, the coating film has recently been required to be as thin as about 25 to 40 $\mu$m, while the coating film thickness required is about 100 to 300 $\mu$m in conventional powder coating. It is therefore necessary to reduce the mean diameter of the particles constituting the powder coating material from about 30–40 $\mu$m (conventional) to about 10–20 $\mu$m. As the particle diameter decreases, the specific surface increases dramatically. In this case, it is difficult to give a sufficient chance of contact between the transportation face and the particles, in the conventional electrostatic powder coating guns, resulting in significantly reduced charge efficiency. As a result, coating efficiency decreases.

The electrostatic powder coating gun forms a coating film of a single hue on the object to be coated. It has therefore been difficult to use the coating film to form data such as characters, numbers, designs, images and diagrams on the object to be coated. In particular, it has been difficult to represent such data using a plurality of hues. Thus data such as characters has been added after the powder coating material has been baked, using stamps, labels and the like. However this has problems in that it requires excessive steps and detracts from the surface quality of the object to be coated.

Also, it is difficult to have a number of electrostatic powder coating guns corresponding to the number of the hues of the powder coating materials. For this reason, in case of forming plural coating films of plural hues, exchange of a powder coating material of one hue for another powder coating material of another hue must be frequently performed to blow them from one electrostatic powder coating gun. However, this exchange of the powder coating materials takes a long time, so that actual operating time is extremely reduced.

Regarding powder coating material production, a binder resin, a hardener, other additives, etc., and a prepared pigment are first mixed by using a mechanical mixer, then kneaded in a molten state. After being cooled, the mixture is milled to a given particle size to yield a powder coating material for testing. Test coating is conducted by using the powder coating material to form a coating film. If the hue of the coating film is not the desired one, the powder coating material for testing is supplemented with another pigment to obtain another powder coating material for testing. This process must be repeated until the desired hue is obtained. Also, when problems due to heat hysteresis must be avoided, another powder coating material for testing must be produced from a new binder resin, hardener, other additives, etc., and a newly prepared pigment. In short, the preparation of a powder coating material of a desired hue takes a great deal of labor and time.

To resolve these problems, a conventional method has been proposed in which a powder coating material of a desired hue is prepared by mixing plural types of powder coating materials of different hues.

When the conventional method is used for the preparation of a powder coating material of a desired hue, however, a uniform hue cannot be obtained, if the mean diameter of the starting particles is greater than 10 $\mu$m. That is, the diameter of particles constituting powder coating material has a significant influence on the obtainment of a uniform hue. Since the different types of powder coating materials differ from each other in terms of physical properties such as fluidity and chargeability, such different types of powder coating materials of different physical properties are difficult to uniformly mix together, so that the mixed powder coating material is difficult to be uniformly charged. For this reason, in the conventional method, the diameter of the starting particles must be decreased to improve the uniformity of the powder coating material.

Further, powder coating materials of different types cannot in practice be separated once they have been mixed. Therefore, once mixed, powder coating materials cannot be reused to form coating films of different hues.

The present invention aims to provide an electrostatic powder coating method which is able to overcome the abovementioned problems by using electrophotographic technology in electrostatic powder coating technology.

SUMMARY OF THE INVENTION

In one aspect of the present invention, the electrostatic powder coating method comprises a latent-image forming step in which an electrostatic latent image is formed on a light-sensitive body; a developing step in which the electrostatic latent image is developed by making a thermosetting powder coating material adhere under electrostatic force to the light-sensitive body; a transfer step in which the powder coating material on the light-sensitive body is transferred onto an object to be coated; and a baking step in which the powder coating material is thermally set in such a way that it is able to bake onto the object to be coated. According to one aspect of the method of the present invention, the coating film is formed, without using an electrostatic powder coating gun, by transferring the powder coating material, which is adhering to a light-sensitive body under electrostatic force, onto the object to be coated. Moreover, since this coating film corresponds to the shape of an electrostatic latent image, the coating film can be used to form any desired character, number, design, picture, diagram or the like.

It is preferable that the transfer step has a first transfer step in which the powder coating material on the light-sensitive body is transferred onto the transfer part of an intermediate transfer body which is softer than the light-sensitive body and the object to be coated, and a second transfer step in which the powder coating material on the transfer part of the intermediate transfer body is transferred onto the object to be coated; and wherein in the second transfer step, the transfer part of the intermediate transfer body is brought into close contact with the object to be coated. The transfer part of the intermediate transfer body can be made to come into close contact with the object to be coated by making the transfer part softer than the light-sensitive body and the object to be coated. Thus the powder coating material on the transfer part can be reliably transferred onto the object to be coated.

It is preferable that the light-sensitive body takes the form of a belt which is softer than the object to be coated, and the powder coating material is adhered to the outer circumferential surface of the light-sensitive body; and wherein in the second transfer step, the outer circumferential surface of the light-sensitive body is brought into close contact with the object to be coated. The outer circumferential surface of the light-sensitive body can be made to come into close contact with the object to be coated by giving the light-sensitive body a belt shape which is softer than the object to be coated. Thus the powder coating material adhering to the outer circumferential surface of the light-sensitive body can be reliably transferred onto a hard object to be coated such as a metal or thermosetting resin plate.

It is preferable that a plurality of types of powder coating materials of different hues are sequentially transferred onto the object to be coated by means of the latent-image forming step, developing step and transfer step, and then the plurality of types of powder coating materials are baked onto the object to be coated by means of the baking step. A coating film of a plurality of hues, that is, a multicolored coating film can be used to form any desired character, number, design, picture, diagram or the like by baking a plurality of types of powder coating materials of different hues onto the object to be coated. The hues of the coating film are determined in accordance with the hues of the various types of powder coating materials and the amounts adhering on the object to be coated. In this way a coating film of the target hues can be formed without mixing a plurality of types of powder coating materials. Thus, in addition to obtaining a coating film of a plurality of hues; each of which is uniform, the influence of the size of the powder coating material particles can be reduced.

It is preferable that the object to be coated is coated in white, and powder coating materials of other colors are transferred onto the white coated area. By this method, a coating film of the target hues can be obtained without sustaining any influence from the base color of the object to be coated.

In another aspect of the present invention, the electrostatic powder coating method comprises a latent-image forming step in which an electrostatic latent image is formed on a light-sensitive body; a developing step in which the electrostatic latent image is developed by making a thermosetting powder coating material adhere under electrostatic force to the light-sensitive body; a transfer step in which the powder coating material on the light-sensitive body is transferred onto a transfer sheet; a temporary fixing step in which the powder coating material is heated to a temperature less than the setting temperature of the powder coating material in such a way that it can be temporarily fixed on the transfer sheet; a baking step in which the powder coating material is thermally set in a state in which it is pressed against the object to be coated, in such a way that it is able to bake onto the object to be coated; and a peeling step in which the transfer sheet is peeled from the powder coating material which has been baked onto the object to be coated. According to another aspect of the method of the present invention, the coating film can be formed, without using an electrostatic powder coating gun, by transferring the powder coating material, which is adhering to a light-sensitive body under electrostatic force, onto the object to be coated via the transfer sheet. Moreover, since this coating film corresponds to the shape of the electrostatic latent image, the coating film can be used to form any desired character, number, design, picture, diagram or the like.

It is preferable that a plurality of types of powder coating materials of different hues are sequentially transferred onto the transfer sheet by means of the latent-image forming step, developing step and transfer step, the plurality of types of powder coating materials are then temporarily fixed on the transfer sheet by means of the temporary fixing step, and then the plurality of types of powder coating materials are baked onto the object to be coated by means of the baking step. A coating film of a plurality of hues can be used to form any desired character, number, design, picture, diagram or the like by baking a plurality of types of powder coating materials of different hues onto the object to be coated. The hues of the coating film are determined in accordance with the hues of the various types of powder coating materials and the amounts adhering on the object to be coated. In this way a coating film of the target hues can be formed without mixing a plurality of types of powder coating materials. Thus, in addition to obtaining a coating film of uniform hues, the influence of the size of the powder coating material particles can be reduced.

It is preferable that the plurality of types of powder coating materials includes powder coating materials of three primary colors. In this way a coating film of any desired hues can be obtained in accordance with the amounts of the powder coating materials of the three primary colors adhering to the object to be coated.

By using the electrostatic powder coating method of the present invention, a coating film with no uneven coloring can be formed without the disadvantages associated with the use of an electrostatic powder coating gun, and without reducing the size of the powder coating material particles more than is necessary. Further, waste of the powder coating material can be avoided. Also, any desired information such as characters can be easily formed on the object to be coated using a coating film of a plurality of hues.

BRIEF DESCRIPTION OF THE DRAWINGS

FIG. 2 (1) to FIG. 2 (5) are explanatory views of the powder coating steps of the first embodiment of the present invention;

FIG. 5 (1) to FIG. 5 (4) are explanatory views of the powder coating steps of the third embodiment of the present invention; and FIG. 6 (1) and FIG. 6 (2) are explanatory views of the powder coating steps of the third embodiment of the present invention.

DESCRIPTION OF THE PREFERRED EMBODIMENTS

A first embodiment of the present invention is now explained with reference to FIG. 1 and FIG. 2 (1) to FIG. 2 (5).

Figure 1:
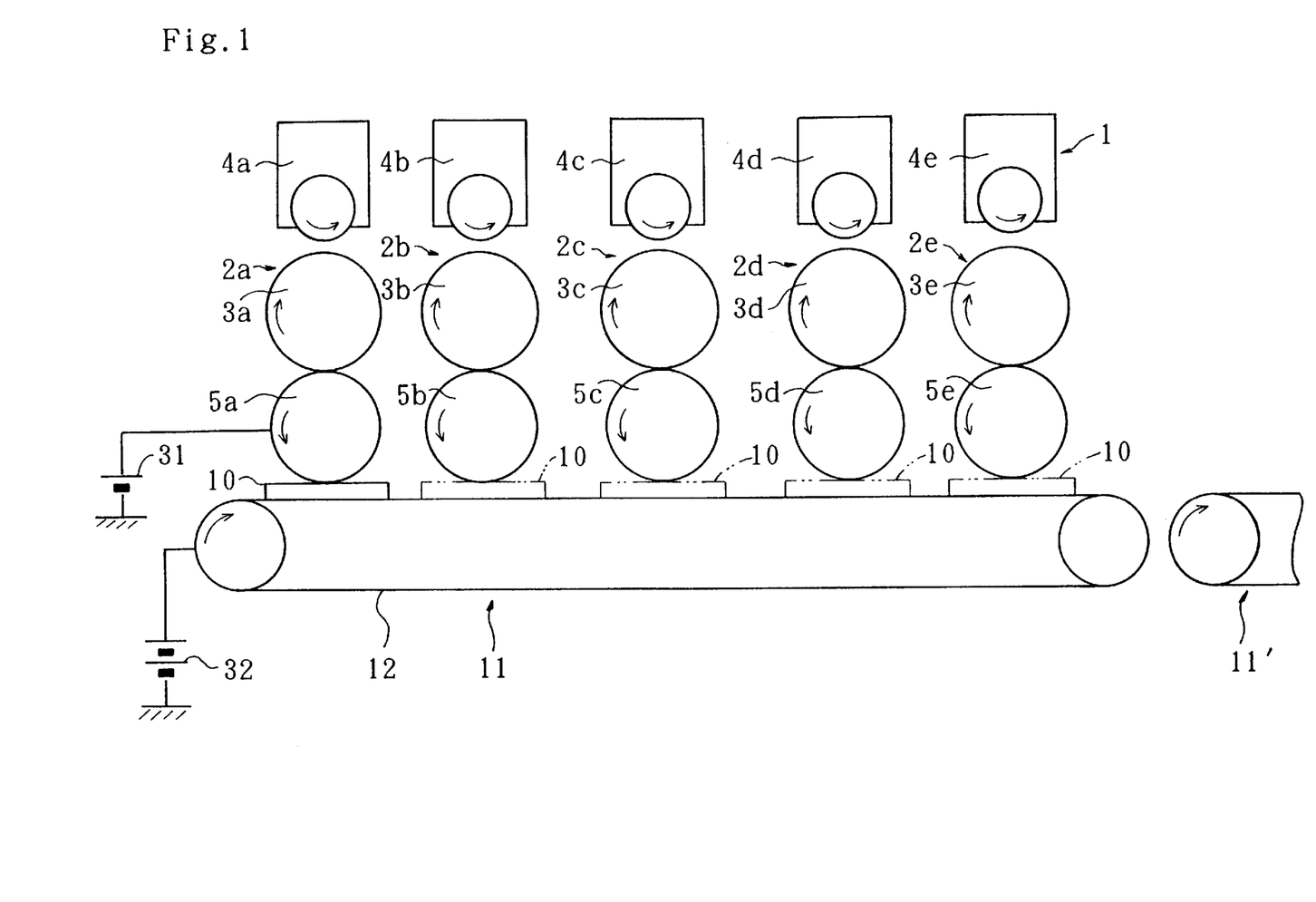
FIG. 1 is an explanatory view of the arrangement of a device for implementing the powder coating method of a first embodiment of the present invention.
Figure 2:
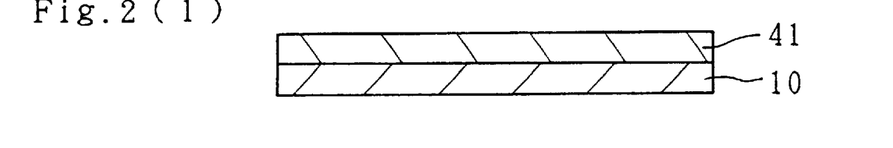

The electrostatic powder coating device 1 shown in FIG. 1 is equipped with first through fifth painting devices 2a, 2b, 2c, 2d and 2e, and with a conveyor device 11 positioned below the painting devices 2a, 2b, 2c, 2d and 2e.

The painting devices 2a, 2b, 2c, 2d and 2e have drum-shaped light-sensitive bodies 3a, 3b, 3c, 3d and 3e which are driven in rotation in the direction of the arrows in the figure, a mechanism (not depicted) for forming electrostatic latent images on the light-sensitive bodies 3a, 3b, 3c, 3d and 3e, developing devices 4a, 4b, 4c, 4d and 4e having developing rollers which are driven in rotation in the direction of the arrows in the figure, and drum-shaped intermediate transfer bodies 5a, 5b, 5c, 5d and 5e which are driven in rotation in the direction of the arrows in the figure. The mechanism for forming the electrostatic latent images, the light-sensitive bodies 3a, 3b, 3c, 3d and 3e, and the developing devices 4a, 4b, 4c, 4d and 4e which are employed can be of a known construction used in electronic photocopiers.

Electrostatic latent images are formed on the outer circumferential surfaces of the light-sensitive bodies 3a, 3b, 3c, 3d and 3e by exposure from the exposure device of the known mechanism for forming electrostatic latent images. Before the electrostatic latent image is formed, any residual latent image is removed using the pre-exposure device of the known mechanism for forming electrostatic latent images.

Statically charged thermosetting powder coating materials adhere under electrostatic force to the light-sensitive bodies 3a, 3b, 3c, 3d and 3e due to the rotation of the developing rollers of the developing devices 4a, 4b, 4c, 4d and 4e. Developing agents which can be used include two-component developing agents comprising a powder coating material intermixed with magnetic particles acting as a carrier, and non-magnetic one-component developing agents comprising a powder coating material incorporating non-magnetic particles, as in electrophotographic technology. When black single-color painting is to be carried out, a one-component developing agent comprising a powder coating material incorporating magnetic particles can be used.

The outer circumferential parts of the intermediate transfer bodies 5a, 5b, 5c, 5d and 5e constitute transfer parts. The transfer parts are formed from a material which is softer than the light-sensitive bodies 3a, 3b, 3c, 3d and 3e and the object 10 to be coated. Each of the intermediate transfer bodies 5a, 5b, 5c, 5d and 5e is formed from an inner roller and an outer film covering the inner roller. The material used in this film can be, for example, a poly vinylidene fluoride based resin intermixed with from 10 to 20% of carbon black such as acetylene black. Semiconducting urethane foam can be used as the material of the inner rollers. In this case, the material used in the surfaces of the light-sensitive bodies 3a, 3b, 3c, 3d and 3e can be amorphous selenium, amorphous silicon or an organic macromolecular body such as polyethylene terephthalate or a polycarbonate. The object 10 to be coated is formed from a material which does not denature at the temperature at which the powder coating material is baked, for example a metal such as steel, a thermosetting plastic or the like. The shape of the object 10 to be coated is not limited to a sheet shape.

The powder coating material on the light-sensitive bodies 3a, 3b, 3c, 3d and 3e is transferred to the outer circumferential surfaces of the intermediate transfer bodies 5a, 5b, 5c, 5d and 5e. To effect this transfer, the outer circumferential surfaces of the intermediate transfer bodies 5a, 5b, 5c, 5d and 5e are brought into close contact with the outer circumferential surfaces of the light-sensitive bodies 3a, 3b, 3c, 3d and 3e, and the intermediate. transfer bodies 5a, 5b, 5c, 5d and 5e are statically charged to the opposite polarity to that of the charge of the powder coating material on the light-sensitive bodies 3a, 3b, 3c, 3d and 3e. To achieve this static charge, one of the poles of a direct-current power source 31 is connected to each of the intermediate transfer bodies 5a, 5b, 5c, 5d and 5e, while the other pole is earthed.

The conveyor device 11 has a belt conveyor. This belt conveyor has an electrically conductive belt 12 which is driven around in the direction of the arrow in the figure. The object 10 to be coated is conveyed by means of this conveyor belt 12. The intermediate transfer bodies 5a, 5b, 5c, 5d and 5e are pressed against the upper surface of the object 10 to be coated while it is being conveyed. In this way, the powder coating materials on the outer circumferential surfaces of the intermediate transfer bodies 5a, 5b, 5c, 5d and 5e are transferred onto the object 10 to be coated. To effect this transfer, the outer circumferential surfaces of the intermediate transfer bodies 5a, 5b, 5c, 5d and 5e are brought into close contact with the upper surface of the object 10 to be coated, and the conveyor belt 12 is statically charged to a voltage higher than the voltage applied by the abovementioned direct-current power source 31, at the opposite polarity to that of the charge of the powder coating materials on the intermediate transfer bodies 5a, 5b, 5c, 5d and 5e. To achieve this static charge, one pole of a direct-current power source 32 is connected to the conveyor belt 12, while the other pole is earthed.

As shown in FIG. 2 (1), the hue of the powder coating material 41 adhered to the object 10 to be coated by means of the first painting device 2a is white. As shown in FIG. 2 (2), the hue of the powder coating material 42 adhered to the object 10 to be coated by means of the second painting device 2b is yellow. As shown in FIG. 2 (3), the hue of the powder coating material 43 adhered to the object 10 to be coated by means of the third painting device 2c is magenta. As shown in FIG. 2 (4), the hue of the powder coating material 44 adhered to the object 10 to be coated by means of the fourth painting device 2d is cyan. As shown in FIG. 2 (5), the hue of the powder coating material 45 adhered to the object 10 to be coated by means of the fifth coating device 2e is black. In other words, a plurality of types of powder coating materials of different hues are sequentially adhered on the object 10 to be coated. The order in which the yellow, magenta and cyan powder coating materials are adhered is not limited. The powder coating materials 42, 43, 44 and 45 of other colors are adhered in the area in which the white powder coating material 41 has been adhered. In the present embodiment, the white powder coating material 41 is adhered over the whole of the upper surface of the object 10 to be coated.

The object 10 to be coated, on which the powder coating materials 41, 42, 43, 44 and 45 have been adhered, is conveyed from the conveyor device 11, via another conveyor device 11', to a baking device (not depicted). The baking device which can be employed can be of a known construction such as an infrared heater or an electric furnace. Using the baking device, the powder coating materials 41, 42, 43, 44 and 45 adhered to the object 10 to be coated are subjected to thermosetting in such a way that they are able to bake onto the object 10 to be coated.

In the first embodiment discussed above, an electrostatic latent image is first formed on the light-sensitive body 3a by means of the first painting device 2a. The white thermosetting powder coating material 41 adheres under electrostatic force to the light-sensitive body 3a. Thus the electrostatic latent image is developed. The powder coating material 41 on the light-sensitive body 3a is transferred onto the transfer part of the intermediate transfer body 5a which is softer than the light-sensitive body 3a and the object 10 to be coated. The powder coating material 41 on the transfer part of the intermediate transfer body 5a is transferred onto the object 10 to be coated. The transfer part of the intermediate transfer body 5a is brought into close contact with the object 10 to be coated at this time. In a similar way, the yellow powder coating material 42 is then transferred onto the object 10 to be coated by means of the second painting device 2b. In a similar way, the magenta powder coating material 43 is then transferred onto the object 10 to be coated by means of the third painting device 2c. In a similar way, the cyan powder coating material 44 is then transferred onto the object 10 to be coated by means of the fourth painting device 2d. In a similar way, the black powder coating material 45 is then transferred onto the object 10 to be coated by means of the fifth painting device 2e. After this, the powder coating materials 41, 42, 43, 44 and 45 on the object 10 to be coated are thermally set so as to be baked onto the object 10 to be coated. The coating film is then complete.

Figure 3:
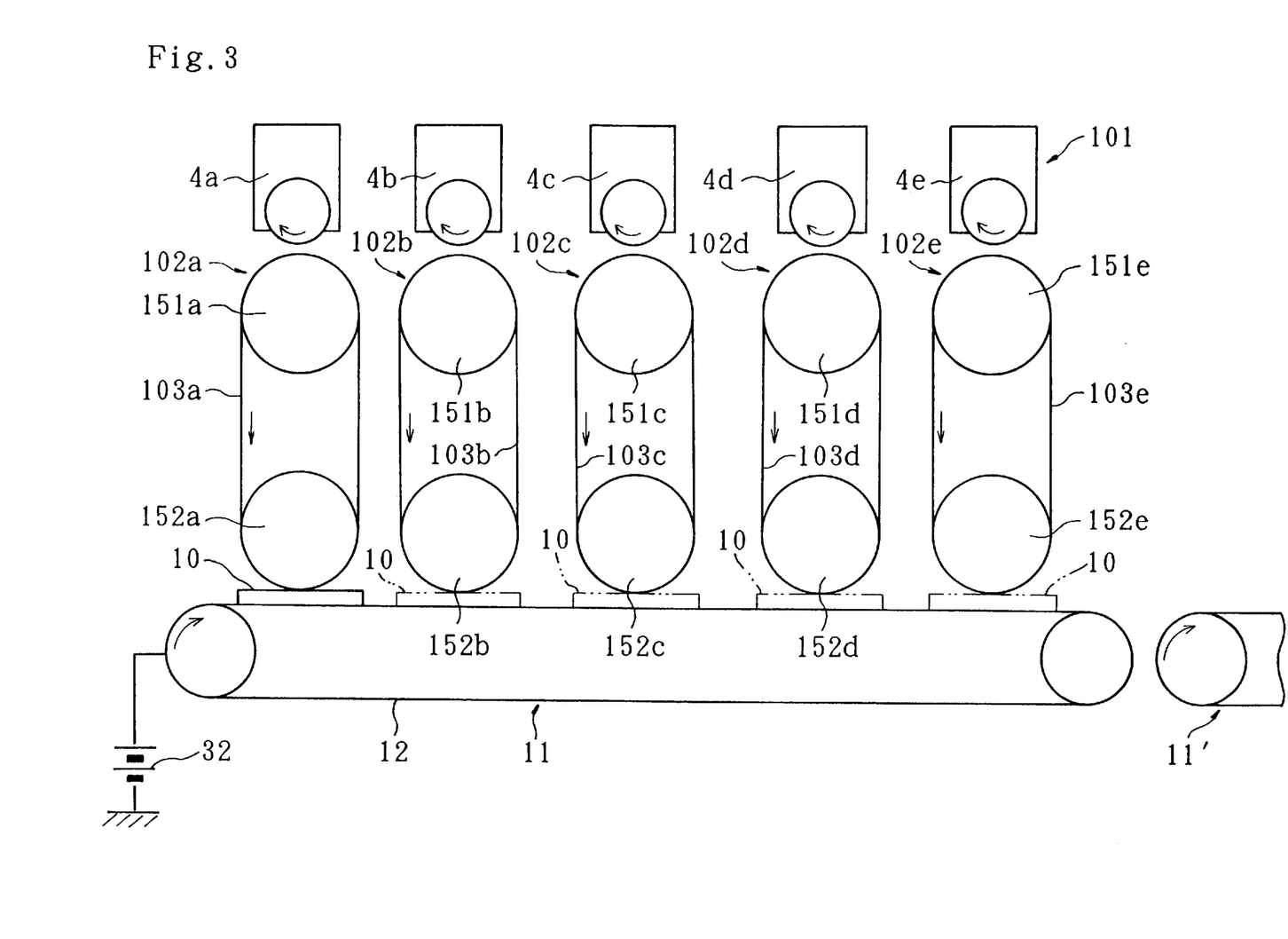
FIG. 3 is an explanatory view of the arrangement of a device for implementing the powder coating method of a second embodiment of the present invention.

FIG. 3 shows an electrostatic powder coating device 101 of a second embodiment of the present invention.

A difference from the first embodiment discussed above is that the light-sensitive bodies 103a, 103b, 103c, 103d and 103e take the form of highly flexible belts which are softer than the object 10 to be coated. The light-sensitive bodies 103a, 103b, 103c, 103d and 103e are wrapped around rollers 151a, 151b, 151c, 151d and 151e and 152a, 152b, 152c, 152d and 152e, and are driven around in the direction of the arrows in the figure. Corresponding to this direction in which they are driven around, the developing rollers are driven in rotation in the direction of the arrows in the figure. There are no intermediate transfer bodies 5a, 5b, 5c, 5d and 5e. Each of the light-sensitive bodies 103a, 103b, 103c, 103d and 103e is made, for example, by putting a layer of a binder such as a polycarbonate containing a photoconductive material in dispersion onto a PET film surface on which an electrically conductive material has been vapor deposited. Preferably the outer circumferential parts of the rollers 152a, 152b, 152c, 152d and 152e around which the light-sensitive bodies 103a, 103b, 103c, 103d and 103e are wound comprise, for example, a sponge material or the like which is softer than the object 10 to be coated and readily elastically deformed, and the object 10 to be coated is sandwiched between the outer circumferential parts of the rollers 152a, 152b, 152c, 152d and 152e and the conveyor belt 12. In this way the powder coating materials 41, 42, 43, 44 and 45 adhering to the outer circumferences of the light-sensitive bodies 103a, 103b, 103c, 103d and 103e are directly transferred to the object 10 to be coated. During this transfer, the outer circumferential surfaces of the light-sensitive bodies 103a, 103b, 103c, 103d and 103e are brought into close contact with the object 10 to be coated. To effect this transfer, the outer circumferential surfaces of the light-sensitive bodies 103a, 103b, 103c, 103d and 103e are brought into close contact with the upper surface of the object 10 to be coated, and the conveyor belt 12 is statically charged to the opposite polarity to that of the charge of the powder coating materials on the light-sensitive bodies 103a, 103b, 103c, 103d and 103e. The rest of the arrangement is as in the first embodiment, and identical portions are depicted using identical reference numbers.

In the second embodiment discussed above, an electrostatic latent image is first formed on the light-sensitive body 103a by means of the first painting device 102a. A white thermosetting powder coating material 41 adheres under electrostatic force to the light-sensitive body 103a. Thus the electrostatic latent image is developed. The powder coating material 41 on the light-sensitive body 103a is transferred onto the object 10 to be coated, at which time the light-sensitive body 103a is brought into close contact with the object 10 to be coated. In a similar way, the yellow powder coating material 42 is then transferred onto the object 10 to be coated by means of the second painting device 102b. In a similar way, the magenta powder coating material 43 is then transferred onto the object 10 to be coated by means of the third painting device 102c. In a similar way, the cyan powder coating material 44 is then transferred onto the object 10 to be coated by means of the fourth painting device 102d. In a similar way, the black powder coating material 44 is then transferred onto the object 10 to be coated by means of the fifth painting device 102e. After this, the powder coating materials 41, 42, 43, 44 and 45 on the object 10 to be coated are thermally set so as to be baked onto the object 10 to be coated. The coating film is then complete.

Using the electrostatic powder coating methods of the first and second embodiments discussed above, a coating film can be formed, without using an electrostatic powder coating gun, by transferring the powder coating materials 41, 42, 43, 44 and 45 adhering under electrostatic force to the light-sensitive bodies 3a, 3b, 3c, 3d and 3e, and 103a, 103b, 103c, 103d and 103e, onto the object 10 to be coated. Since the coating film corresponds to the shape of the electrostatic latent image, the coating film can be used to form any desired characters, numbers, designs, images and diagrams or the like.

Further, since a plurality of types of powder coating materials 41, 42, 43, 44 and 45 of different hues are baked after they have been sequentially transferred onto the object 10 to be coated, any desired characters, numbers, designs, images and diagrams or the like can be formed using a coating film of a plurality of hues. The hues of the coating film are determined in accordance with the hues of the various types of powder coating materials 41, 42, 43, 44 and 45 and the amounts adhering to the object to be coated. In this way it is possible to form a coating film of the target hues without any color unevenness, without mixing the plurality of types of powder coating materials 41, 42, 43, 44 and 45. In other words, in addition to obtaining a coated film of a plurality of hues, each of which is uniform, the influence of the size of the constituent particles of the powder coating materials 41, 42, 43, 44 and 45 can be reduced. Further, waste of the powder coating materials is avoided. Further, by using powder coating materials 42, 43 and 44 of three primary colors, coating films of any desired hues can be formed depending on the amounts of the three primary color powder coating materials 42, 43 and 44 adhering to the object 10 to be coated. Again, by coating the object 10 to be coated in white and transferring the powder coating materials 42, 43, 44 and 45 of the other colors onto this white coated area, the effects of the background color of the object 10 to be coated are avoided.

In the first embodiment, the transfer parts of the intermediate transfer bodies 5a, 5b, 5c, 5d and 5e are softer than the light-sensitive bodies 3a, 3b, 3c, 3d and 3e and the object 10 to be coated and, therefore, the transfer parts can be brought into close contact with the object 10 to be coated. By so doing, the powder coating materials 41, 42, 43, 44 and 45 can be reliably transferred onto a hard object 10 to be coated of metal, thermosetting resin or the like.

In the second embodiment, the light-sensitive bodies 103a, 103b, 103c, 103d and 103e are softer than the object 10 to be coated and, therefore, the light-sensitive bodies 103a, 103b, 103c, 103d and 103e can be brought into close contact with the object 10 to be coated. By so doing, the powder coating materials 41, 42, 43, 44 and 45 can be reliably transferred onto a hard object 10 to be coated of metal, thermosetting resin or the like.

A third embodiment of the present invention is now discussed with reference to FIG. 4, FIG. 5 (1) to FIG. 5 (4), FIG. 6 (1) and FIG. 6 (2). In this third embodiment, parts which are the same as those in the first embodiment have been given the same reference numbers.

Figure 4:
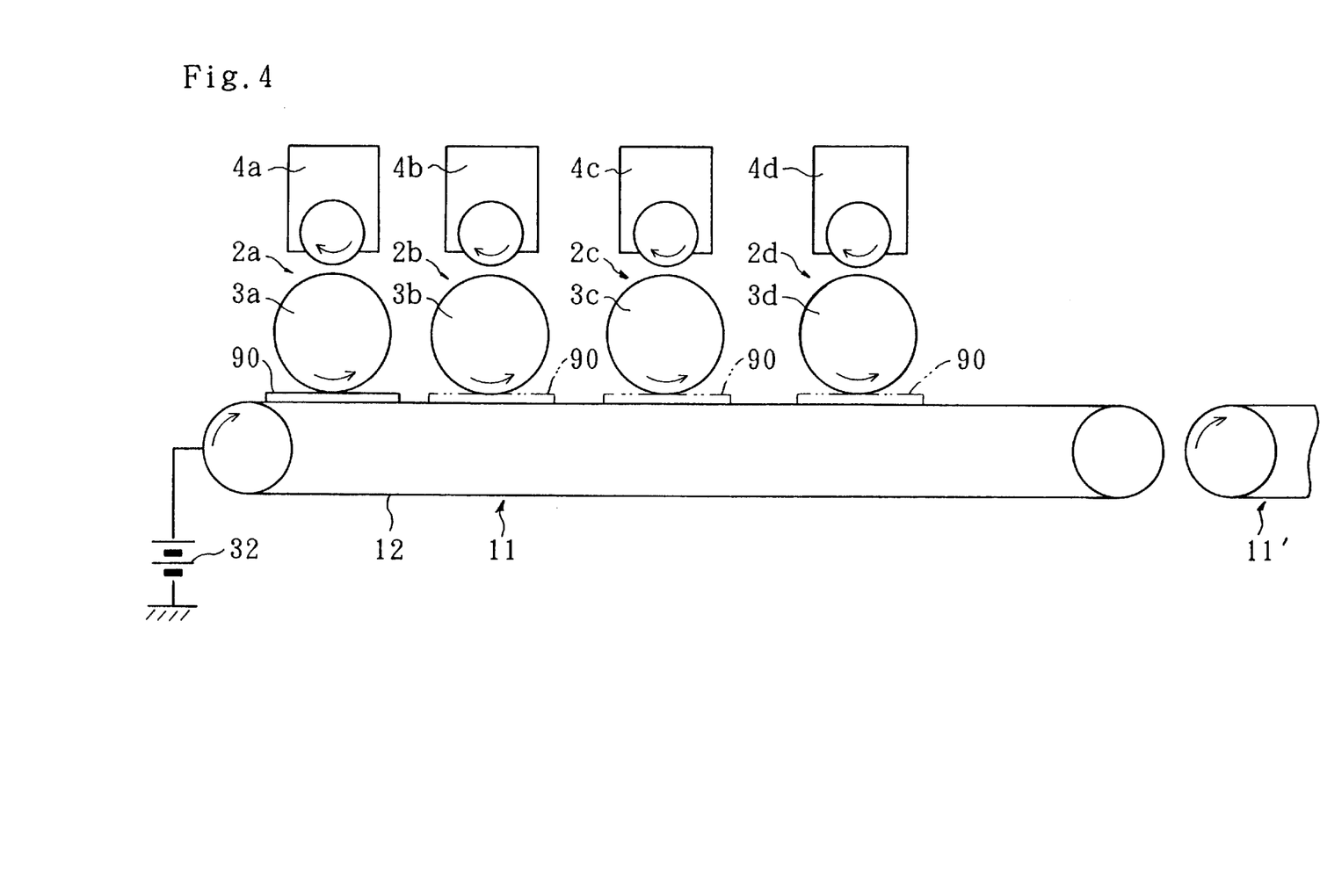
FIG. 4 is an explanatory view of the arrangement of a device for implementing the powder coating method of a third embodiment of the present invention.
Figure 5:
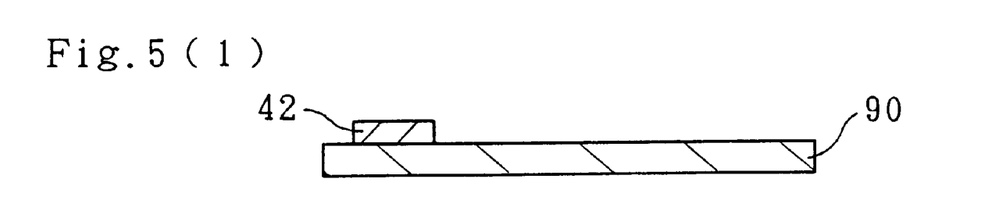
Figure 6:
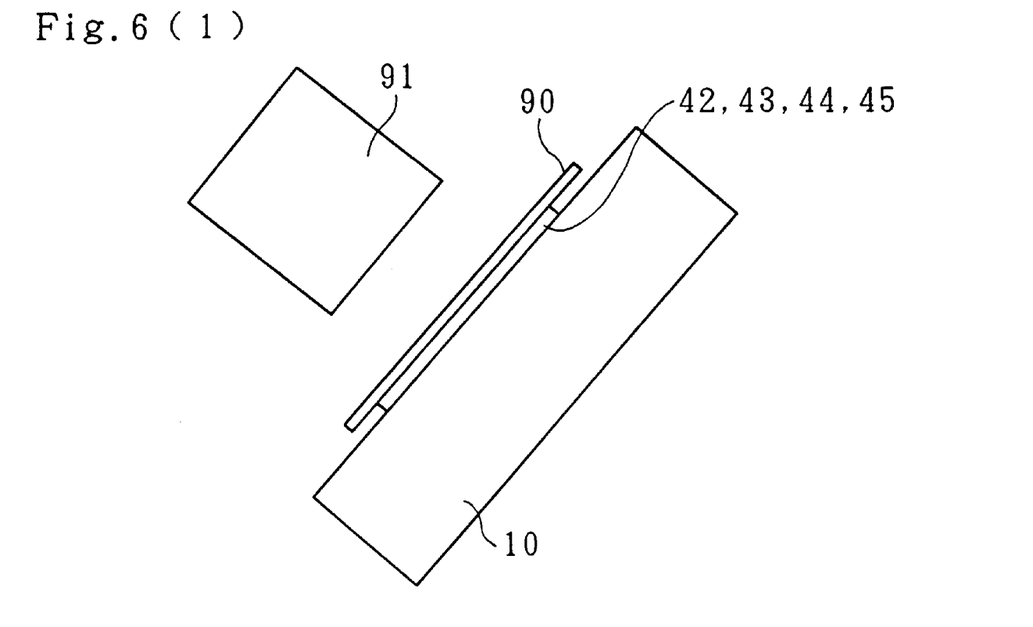

The electrostatic powder coating device shown in FIG. 4 is equipped with first to fourth painting devices 2a, 2b, 2c and 2d, and a conveyor device 11 positioned below the painting devices 2a, 2b, 2c and 2d.

The painting devices 2a, 2b, 2c and 2d have drum-shaped light-sensitive bodies 3a, 3b, 3c and 3d which are driven in rotation in the direction of the arrows in the figure, a mechanism for forming electrostatic latent images on the light-sensitive bodies 3a, 3b, 3c and 3d, and developing devices 4a, 4b, 4c and 4d having developing rollers which are driven in rotation in the direction of the arrows in the figure. The mechanism for forming the electrostatic latent images, the light-sensitive bodies 3a, 3b, 3c and 3d, and the developing devices 4a, 4b, 4c and 4d which are employed can be of a known configuration used in electronic photocopiers.

Electrostatic latent images are formed on the outer circumferential surfaces of the light-sensitive bodies 3a, 3b, 3c and 3d by exposure from the exposure device of the known mechanism for forming electrostatic latent images. Before the electrostatic latent image is formed, any residual latent image is removed using the pre-exposure device of the known mechanism for forming electrostatic latent images.

Statically charged thermosetting powder coating materials adhere under electrostatic force to the light-sensitive bodies 3a, 3b, 3c, and 3d due to the rotation of developing rollers of the developing devices 4a, 4b, 4c and 4d. Developing agents which can be used include two-component developing agents comprising a powder coating material intermixed with magnetic particles acting as a carrier, and non-magnetic one-component developing agents comprising a powder coating material incorporating non-magnetic particles, as in electrophotographic technology. When black single-color painting is to be carried out, a one-component developing agent comprising a powder coating material incorporating magnetic particles can be used.

The conveyor device 11 has a belt conveyor. This belt conveyor has an electrically conductive belt 12 which is driven around in the direction of the arrow in the figure. A transfer sheet 90 is conveyed by means of this conveyor belt 12. The light-sensitive bodies 3a, 3b, 3c and 3d are sequentially pressed against the upper surface of the transfer sheet 90 while it is being conveyed. In this way, the powder coating materials on the outer circumferential surfaces of the light-sensitive bodies 3a, 3b, 3c and 3d are transferred onto the transfer sheet 90. To effect this transfer, the outer circumferential surfaces of the light-sensitive bodies 3a, 3b, 3c and 3d are brought into close contact with the upper surface of the transfer sheet 90, and the conveyor belt 12 is statically charged at the opposite polarity to that of the charge of the powder coating materials on the light-sensitive bodies 3a, 3b, 3c and 3d. To achieve this static charge, one pole of a direct-current power source 32 is connected to the conveyor belt 12, while the other pole is earthed.

As shown in FIG. 5 (1), the hue of the powder coating material 42 adhered to the transfer sheet 90 by means of the first painting device 2a is black. As shown in FIG. 5 (2), the hue of the powder coating material 43 adhered to the transfer sheet 90 by means of the second painting device 2b is cyan. As shown in FIG. 5 (3), the hue of the powder coating material 44 adhered to the transfer sheet 90 by means of the third painting device 2c is magenta. As shown in FIG. 5 (4), the hue of the powder coating material 45 adhered to the transfer sheet 90 by means of the fourth painting device 2d is yellow. In other words, a plurality of types of powder coating materials of different hues are sequentially adhered on the transfer sheet 90. The order in which the yellow, magenta and cyan powder coating materials are adhered is not limited.

The transfer sheet 90, on which the powder coating materials 42, 43, 44 and 45 have been adhered, is conveyed from the conveyor device 11, via another conveyor device 11', to a fixing device (not depicted). The fixing device employed can be of a known construction such as a pair of pressure pinch rollers incorporating a heater. By passing the transfer sheet 90 between the pair of pressure pinch rollers, the powder coating materials 42, 43, 44 and 45 adhering to the transfer sheet 90 are heated to a temperature below the setting temperature of the powder coating materials 42, 43, 44 and 45. In this way the powder coating materials 42, 43, 44 and 45 are temporarily fixed on the transfer sheet 90. The temporarily fixed powder coating materials 42, 43, 44 and 45 are preferably covered by a protective film of polyethylene, Teflon, PET film or the like until the baking discussed below is carried out.

The material of the transfer sheet 90 is flexible, is able to adhere to the powder coating materials 42, 43, 44 and 45 which are viscous when heated to a temperature less than their setting temperature, is not baked onto by the powder coating materials 42, 43, 44 and 45 which are thermally set in a baking step discussed hereinbelow, and is heat resistant; it being possible to use, for example, a Teflon film or heat-resistant silicon-based film. Preferably, a release agent is applied to the transfer sheet 90 in such a way that the transfer sheet 90 can be easily peeled from the powder coating materials 42, 43, 44 and 45 once they have been baked onto the object 10 to be coated in the baking step discussed hereinbelow. Release agents which can be used include, for example, paraffin wax, carnauba wax and silicon wax.

As shown in FIG. 6 (1), the powder coating materials 42, 43, 44 and 45 which are temporarily fixed to the transfer sheet 90 are heated by a heating device 91 in a state in which they have been pressed against the object 10 to be coated. In this way the powder coating materials 42, 43, 44 and 45 are baked onto the object 10 to be coated by being thermally set. The heating device 91 which is employed can be of a known construction such as the infrared heater called a radiant heating device or a dryer which blows out hot air. Then, as shown in FIG. 6 (2), the transfer sheet 90 is peeled from the powder coating materials 42, 43, 44 and 45 which have been baked onto the object 10 to be coated.

In the third embodiment discussed above, an electrostatic latent image is first formed on the light-sensitive body 3a by means of the first painting device 2a. The black thermosetting powder coating material 42 adheres under electrostatic force to the light-sensitive body 3a. Thus the electrostatic latent image is developed. The powder coating material 42 on the light-sensitive body 3a is transferred onto the transfer sheet 90. In a similar way, the cyan powder coating material 43 is then transferred onto the transfer sheet 90 by means of the second painting device 2b. In a similar way, the magenta powder coating material 44 is then transferred onto the transfer sheet 90 by means of the third painting device 2c. In a similar way, the yellow powder coating material 45 is then transferred onto the transfer sheet 90 by means of the fourth painting device 2d. The powder coating materials 42, 43, 44 and 45 on the transfer sheet 90 are then temporarily fixed on the transfer sheet 90 by being heated to a temperature less than the setting temperature. The powder coating materials 42, 43, 44 and 45 on the transfer sheet 90 are then baked onto the object 10 to be coated by being thermally set in a state in which they are pressed against the object to be coated. After this, the transfer sheet 90 is peeled from the powder coating materials 42, 43, 44 and 45 which have been baked onto the object 10 to be coated.

Using the electrostatic powder coating method of the third embodiment discussed above, a coating film can be formed, without using an electrostatic powder coating gun, by transferring the powder coating materials 42, 43, 44 and 45 adhering under electrostatic force to the light-sensitive bodies 3a, 3b, 3c and 3d, via the transfer sheet 90, onto the object 10 to be coated. It will be noted that since the coating film corresponds to the shape of the electrostatic latent image, the coating film can be used to form any desired characters, numbers, designs, images and diagrams or the like.

Further, since a plurality of types of powder coating materials 42, 43, 44 and 45 of different hues are baked onto the object 10 to be coated after they have been sequentially transferred onto the transfer sheet 90, any desired characters, numbers, designs, images and diagrams or the like can be formed using a coating film of a plurality of hues. The hues of the coating film are determined in accordance with the hues of the various types of powder coating materials 42, 43, 44 and 45 and the amounts adhering to the object to be coated. In this way it is possible to form a coating film of the target hues without any color unevenness, without mixing the plurality of types of powder coating materials 42, 43, 44 and 45. In other words, in addition to obtaining a coating film of a plurality of hues each of which is uniform, the influence of the size of the constituent particles of the powder coating materials 42, 43, 44 and 45 can be reduced, and waste of the powder coating materials 42, 43, 44 and 45 is avoided. Further, by using powder coating materials 43, 44 and 45 of three primary colors, a coating film of any desired hues can be formed depending on the amounts of the three primary color powder coating materials 43, 44 and 45 adhering to the object 10 to be coated.

The electrostatic powder coating method discussed above is suitable for obtaining coating films of a single uniform hue by mixed powder coating materials of two or more hues since it allows uniform coating films to be obtained. In this case, in order to apply the powder coating materials uniformly on the object to be coated, the difference between the amounts of static charges of the powder coating materials to be mixed is preferably within 10 $\mu$C/g, the dielectric constant difference is preferably within 0.3, and the resistance ratio is preferably 1/10 to 10. From the point of view of making the powder coating materials set uniformly once they have been applied, the difference between the melting points of the powder coating materials to be mixed is preferably within 10° C. The melting point can be measured by a known flow meter. The difference between the molten viscosities of the powder coating materials to be mixed at the coating material baking temperature is preferably within 300 cp, and the difference between the setting times is preferably within 120 seconds. Further, when mixing a white powder coating material with a coating material of another hue, it is preferable to make the mixing more uniform by adding a fine-grained powder such as fumed silica or titanium oxide as a fluidity enhancer.

The present invention is not limited to the embodiments discussed above. For example, there is no limitation on the hues of the powder coating materials. Further, a white coating material can be coated onto the object to be coated by a coating method which is different to what has been discussed above, and then a method of any of the embodiments discussed above can be used to coat layers on top of this white coated area. By way of example, when the object to be coated is of steel or the like, a pretreatment such as degreasing can be carried out, then the metal surface can be coated with a white coating material using a coating method employing a conventional electrostatic powder coating gun, and then coating using a method of the present invention can be carried out.

What is claimed is:

1. An electrostatic powder coating method comprising:
    forming an electrostatic latent image on a light-sensitive body;
    developing the electrostatic latent image by making a thermosetting powder coating material adhere under electrostatic force to the light-sensitive body;
    transferring the powder coating material on the light-sensitive body onto a hard object to be coated; and
    thermally setting the powder coating material in such a way that it is able to bake onto the hard object to be coated.

2. An electrostatic powder coating method according to claim 1, wherein
    the transferring step has a first transfer step in which the powder coating material on the light-sensitive body is transferred onto the transfer part of an intermediate transfer body which is softer than the light-sensitive body and the hard object to be coated, and a second transfer step in which the powder coating material on the transfer part of the intermediate transfer body is transferred onto the hard object to be coated; and wherein
    in the second transfer step, the transfer part of the intermediate transfer body is brought into close contact with the hard object to be coated.

3. The electrostatic powder coating method according to claim 1, wherein
    the light-sensitive body takes the form of a belt which is softer than the hard object to be coated, and the powder coating material is adhered to the outer circumferential surface of the light-sensitive body; and wherein
    in the second transfer step, the outer circumferential surface of the light-sensitive body is brought into close contact with the hard object to be coated.

4. The electrostatic powder coating method according to claim 1, wherein a plurality of types of powder coating materials of different hues are sequentially transferred onto the hard object to be coated by means of the latent-image forming step, developing step and transfer step, and then the plurality of types of powder coating materials are baked onto the hard object to be coated by means of the baking step.

5. The electrostatic powder coating method according to claim 4, wherein the hard object to be coated is coated in white, and powder coating materials of other colors are transferred onto the white coated area.

6. The electrostatic power coating method according to claim 5, wherein the plurality of types of powder coating materials includes powder coating materials of three primary colors.

7. The electrostatic powder coating method according to claim 6, wherein a plurality of types of powder coating materials of different hues are sequentially transferred onto the transfer sheet by means of the latent-image forming step, developing step and transfer step, the plurality of types of powder coating materials are then temporarily fixed on the transfer sheet by means of the temporary fixing step, and then the plurality of types of powder coating materials are baked onto the hard object to be coated by means of the baking step.

8. The electrostatic powder coating method according to claim 7, wherein the plurality of types of powder coating materials includes powder coating materials of three primary colors.

9. The electrostatic powder coating method according to claim 1, wherein the hard object is a metal or a thermosetting resin plate.

10. An electrostatic powder coating method comprising:
    forming an electrostatic latent image on a light-sensitive body;
    developing the electrostatic latent image by making a thermosetting powder coating material adhere under electrostatic force to the light-sensitive body;
    transferring the powder coating material on the light-sensitive body onto a transfer sheet;
    temporarily fixing the powder coating material on the transfer sheet by heating to a temperature less than the setting temperature of the powder coating material;
    thermally setting the powder coating material as it is pressed against the object to be coated, thereby baking the powder coating material onto the hard object to be coated; and
    peeling the transfer sheet from the powder coating material which has been baked onto the hard object to be coated.

11. Electrostatic powder coating method according to claim 1, wherein the difference between the amounts of static charges of the powder coating materials to be mixed is within 10 $\mu C/g$, the difference between the molten viscosities of the powder coating materials to be mixed at the coating material baking temperature is within 300 cp, and the difference between the setting times of the powder coating materials to be mixed is within 120 seconds.

* * * * *